United States Patent
Lochner et al.

(10) Patent No.: US 6,649,114 B2
(45) Date of Patent: Nov. 18, 2003

(54) METHOD AND APPARATUS FOR CONNECTING OBJECTS BY MEANS OF PLASTICALLY DEFORMABLE CONNECTING BODIES

(75) Inventors: Hans Lochner, Berchtesgaden (DE); Marco Hobelsberger, Saaldorf-Surheim (DE); Robert Gschwendtner, Bad Reichenhall (DE)

(73) Assignee: Kiefel Technologies Inc., Hampton, NH (US)

( * ) Notice: Subject to any disclaimer, the term of this patent is extended or adjusted under 35 U.S.C. 154(b) by 174 days.

(21) Appl. No.: 09/920,196

(22) Filed: Aug. 1, 2001

(65) Prior Publication Data

US 2002/0017744 A1 Feb. 14, 2002

(30) Foreign Application Priority Data

Aug. 4, 2000 (DE) ......................... 100 38 158

(51) Int. Cl.[7] ............................. B29C 65/02
(52) U.S. Cl. .................. 264/404; 264/249; 425/392; 425/508; 425/509
(58) Field of Search ................ 425/508, 509, 425/392; 264/249, 479, 480, 404

(56) References Cited

U.S. PATENT DOCUMENTS

| 3,419,297 A | * 12/1968 | Diepenhorst et al. ....... 264/249 |
| 3,900,714 A | * 8/1975 | Beyer .......................... 264/249 |
| 4,633,559 A | * 1/1987 | Loren .......................... 264/249 |
| 4,767,298 A | * 8/1988 | Bocchicchio et al. ....... 264/249 |
| 5,018,957 A | * 5/1991 | Assink et al. ............... 264/249 |
| 5,095,606 A | * 3/1992 | Barrick ........................ 29/509 |
| 5,227,173 A | * 7/1993 | Sherwood .................... 264/249 |
| 5,423,938 A | * 6/1995 | Hofius et al. ............... 425/508 |
| 5,871,784 A | * 2/1999 | Assink et al. ............... 264/249 |
| 6,099,291 A | * 8/2000 | Lanser ......................... 425/508 |
| 6,296,470 B1 | * 10/2001 | Lanser et al. ............... 425/508 |
| 6,298,533 B1 | * 10/2001 | Nishimura et al. ......... 29/243.5 |

FOREIGN PATENT DOCUMENTS

EP        0 965 400        12/1999

* cited by examiner

*Primary Examiner*—Robert Davis
(74) *Attorney, Agent, or Firm*—Cohen, Pontani, Lieberman & Pavane

(57) ABSTRACT

The apparatus for connecting objects by means of a plastically deformable connecting body comprises a shaping punch (4), a flow-restricting wall (5) closely surrounding the shaping punch and a gas supply lead (6) through which a gaseous medium can be introduced into the gap between the shaping punch (4) and the flow-restricting means (5). The shaping punch (4) has a heating cartridge (8) by means of which the lower end of the shaping punch can be heated. Provided on the outside of this shaping punch are heat-transfer ribs (9) which are used to heat up the supplied, gaseous medium which emerges at the lower end of the flow-restricting means in order to produce a flow around a plastically deformable connecting body (3), so that the latter is uniformly heated for the deforming process. The connecting body (3) is also integrally formed on a part (2) and reaches through a hole in a second part (1) which is to be connected to the first part. The shaping punch (4) is used to integrally form a rivet head (3a) on the connecting body (3).

9 Claims, 3 Drawing Sheets

METHOD AND APPARATUS FOR CONNECTING OBJECTS BY MEANS OF PLASTICALLY DEFORMABLE CONNECTING BODIES

BACKGROUND OF THE INVENTION

1. Field of the Invention

The invention relates to a method for connecting objects by means of at least one plastically deformable connecting body, in which the connecting body is first of all heated and is subsequently permanently deformed by means of a shaping punch. The invention also relates to an apparatus for carrying out the method.

2. Description of the Related Art

In a known method according to EP 0 965 400 A2, the connecting body, which constitutes a projection of one of the two parts which are to be connected, is first of all heated by means of a hot-air nozzle, after which a cold punch is then used to deform the connecting body which reaches through a second part which is to be riveted on and connects the latter to the first part by means of the integrally formed rivet head.

Riveting methods of this type require a high use of energy, since the hot air flowing out of the nozzle not only heats up the connecting body, i.e. the rivet, but also the surrounding material, which may sometimes lead to visual impairments or even to damage to the material. In addition, the connection is frequently not characterized by a particularly good press fit, which is generally attributed to the non-uniform heating up of the projection, connecting body or rivet.

SUMMARY OF THE INVENTION

The object of the invention is to provide a method and an apparatus for connecting objects by means of plastically deformable connecting bodies with the aid of which high-strength, thermal rivet connections can be obtained in an energy-saving manner without impairing the material surrounding the connecting body.

According to the invention, a heated gas flow which flows closely around the connecting body is produced in order to uniformly heat the connecting body prior to deformation. The heating action is ended at the latest directly after the deformation, depending on the heat contents of the system comprising the connecting body and shaping punch, and a cool gas flow is maintained until the deformed connecting body and the shaping punch are cooled.

By means of the hot gas flow which flows closely around the connecting body, not only is completely uniform heating of the connecting body, and therefore a particularly good prerequisite for the subsequent deforming and riveting process, obtained, but also the heating up of the material surrounding the connecting body is avoided, which is of particularly significant importance if the materials in this case are temperature-sensitive materials. The uniform heating through of the connecting body is an essential prerequisite for a homogenous material structure after the deformation, i.e. after the riveting, so that the rivet connection obtained by this means is distinguished by high strength and withstands high loading forces. The time for ending the heating action depends on the strength of the heat contents of the entire system formed from the connecting body and the shaping punch. If, for example, the operation is carried out with a cold shaping punch and as a result there is the risk of the connecting body cooling too rapidly, depending on its mass, if the heating action is shut off relatively early, then the heating action inevitably has to be maintained for somewhat longer than if the heat conditions are more favourable, thus enabling the heating action to be switched off somewhat earlier so as to shorten the cycle times.

The expression "connecting body" is to be understood as either a loose rivet which can be introduced into a hole of the two parts to be connected or as a projection on one part which can be passed through a hole in the part to be fastened on.

The gas flow necessary for uniform heating of the connecting body is heated by a heating element provided in the region of the connecting body.

In order to cool both the shaping punch and the rivet head which is formed, in a further development of the invention the gas flow is increased in terms of quantity after the end of the heating action. By this means, the cooling action is accelerated.

In a first variant of the method, the shaping punch is heated for the deformation and the gas flow is heated by the shaping punch.

In order for the shaping punch to be able to heat the gas flow as intensively as possible, in a further development of the invention provision is made for the gas flow at the upper end of the connecting body to be directed downwards and to be restricted outwards by a wall. It is thereby possible to guide the gas flow very closely and at high speed around the shaping punch and as a result to obtain a good heat transfer between the shaping punch and gas flow. In addition, the restriction by means of a wall has the advantage that a small, heated quantity of gas which is guided very closely around the deformable connecting body suffices, as a result of which little energy is required for the uniform heating up and plasticization. In addition, outer regions of the parts to be connected are not affected detrimentally.

In order to obtain these advantages in a particularly impressive form, it is provided, in an expedient refinement, that the wall surrounds the shaping punch, at least in the region of its heating, with little clearance and the gas flow is introduced into the gap between the shaping punch and wall from above in the direction of the free end of the shaping punch.

The gas flow is preferably accelerated in the direction of the free end of the shaping punch.

In a second variant of the method, provision is made for the wall to be designed as a radiating element and to heat both the deformable connecting body and the gas flow. In this type of method, it is also essential that the gas flow contributes to the uniform heating up of the connecting body, since in most cases the radiating heating element cannot be designed so uniformly with respect to its radiated heat that a completely uniform heating of the connecting body would be ensured without a gas flow.

In this second method variant, the gas flow is guided through a channel within the shaping punch and, emerging at the free end thereof, is directed onto the deformable connecting body. By this means, uniform flow around the connecting body, and therefore a uniform distribution of temperature within this connecting body, is ensured.

The apparatus, in particular for carrying out the method, having a shaping punch for deforming a deformable connecting body, a heating means for heating the connecting body and a device for supplying a gaseous medium to the connecting body, is characterized, in a first variant, in that the shaping punch is held, and guided in a vertically displaceable manner, at least with its heatable, lower, free end in a flow-restricting means for the gaseous medium, in which case the medium can be introduced into the gap between the shaping punch and flow-restricting means.

In this design variant, the gaseous medium is heated by the shaping punch, which contributes to the evening out of the temperature in the deformable connecting body, after which this connecting body is deformed by means of the heated shaping punch.

The reference to the fact that the apparatus is provided in particular for carrying out the method means that this apparatus can be used without any structural change not only for deforming connecting bodies, but also for deforming objects which are not used for connecting parts, but rather only have to be deformed in their design, for example at the end of a projection.

In a preferred refinement of the invention, the shaping punch is guided together with the flow-restricting means in a vertically displaceable manner.

In order to obtain an effective use of energy for heating the shaping punch and the gaseous medium, in a development of the invention the shaping punch is equipped in the interior with an electric heating means and is surrounded, with little clearance, by a flow-restricting means which has a gas supply line and conducts the gas flow to the deformable connecting body. The electrically heated shaping punch heats the gas medium which is introduced into the gap between the shaping punch and flow-restricting means and is heated rapidly and with little expenditure of energy because of the relatively narrow gap.

A preferred refinement of this apparatus is characterized in that the electric heating means is arranged, as a heating cartridge, in the direct vicinity of the front end of the thin-walled, low-mass shaping punch. The formation of the shaping punch with a thin wall and therefore with a small mass has the advantage that the heating of the shaping punch can take place with little energy and that a rapid temperature change between heating and cooling is possible. Since the heating energy is deployed in the direct vicinity of the end used for deforming the connecting body, energy is thereby saved and the heating and cooling processes take place more rapidly.

It may be advantageous, particularly when relatively large amounts of gas are used, if, in a development of the invention, the shaping punch is provided on its outside in the heating region with heat-transfer ribs, since by this means, in particular in conjunction with a narrow clearance for the flow-restricting means, a very good heat transfer between the shaping punch and the gas which is to be heated up is obtained.

If the flow-restricting means is tapered in a nozzle-like manner at its lower, open end, then the gaseous medium is accelerated in the direction of the connecting body to be heated, which increases the heat transfer. This refinement is particularly advantageous if the heating punch is provided with heat-transfer ribs. The tapering then brings about a relatively small outlet cross section, with the result that the flow-restricting means is at a very small distance from the connecting body at the outlet end. By this means, not only is particularly good heating of the connecting body obtained, but also the material surrounding the connecting body is shielded against the effect of heat.

According to a second design variant, the flow-restricting means is designed as a radiating heating means surrounding the shaping punch and the gas supply is formed by a channel which is provided within the punch and opens out at the free end of the punch. By this means, the gas flow is directed from above onto the connecting body, flows around the latter and is heated by the radiating heating means, with the result that the gas flow contributes to evening out the heating of the connecting body. In addition, the gas supply within the shaping punch is used for cooling the latter, in order to reduce the cycle times, since the said shaping punch is heated up on the heated connecting body in the deforming process.

The shaping punch can be displaced relative to the radiating heating means, so that it only passes into a heated region during the deforming process.

DETAILED DESCRIPTION OF THE PRESENTLY PREFERRED EMBODIMENTS

All of the design variants of the apparatus according to FIGS. 1 to 6 are used for connecting at least two parts 1 and 2, the part 2 consisting of a plastic which can be plasticized and having a projection 3 which is deformed in the manner of a rivet by the apparatus which has still to be described, in order to join together the two parts 1 and 2. This projection is referred to in the following text as a connecting body, since it does not matter whether the connecting body is designed integrally with one of the two parts to be connected, as in the exemplary embodiment illustrated; but the connecting body may also be designed as a loose rivet which is guided through both parts to be connected and on one side has a rivet head which has already been premanufactured. The connecting body may also be designed as a bolt, in which case rivet heads are integrally formed in the manner described at both ends of this bolt for the connection of at least two parts. The shape of the deformable body is insignificant for the present method. This deformable body may be round, oval, square or rectangular in cross section. It may consist of solid material or be of hollow design.

Figure 1:
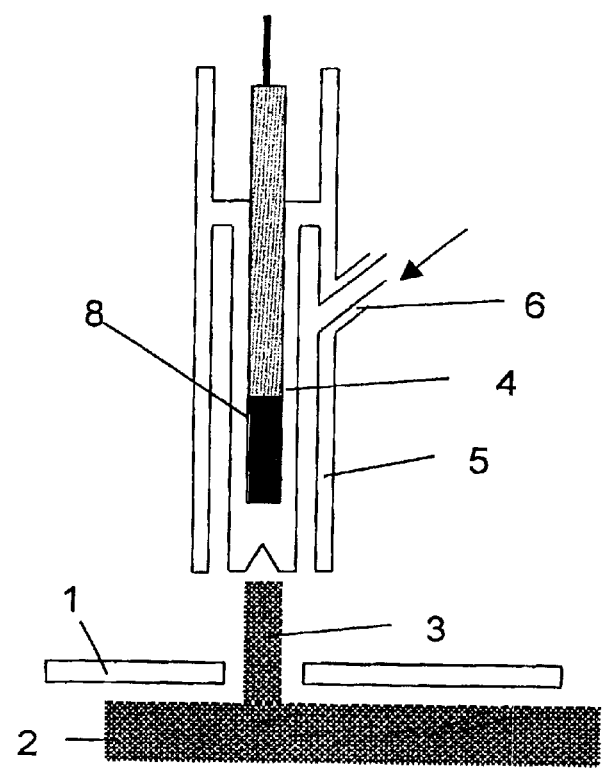
FIG. 1 shows a section through a first design variant of the apparatus directly prior to the deformation of a connecting body.
Figure 2:
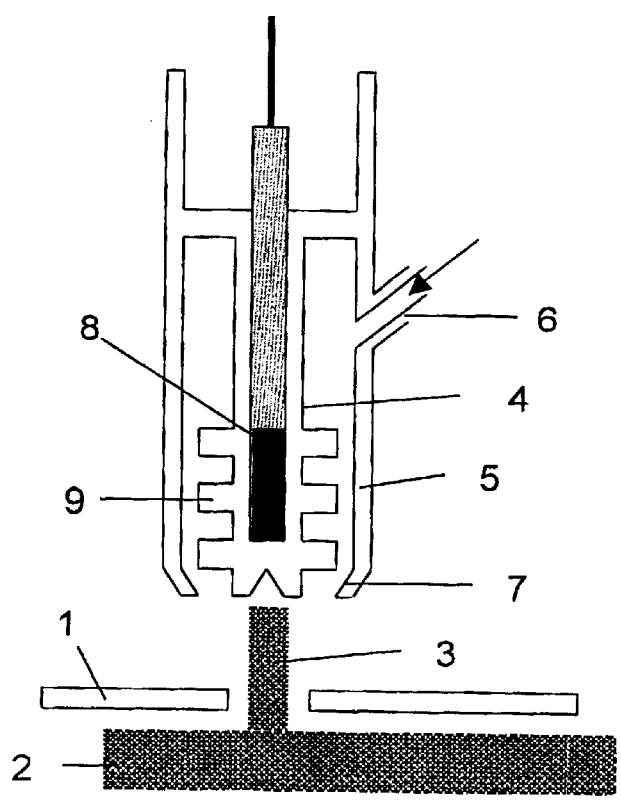
FIG. 2 shows a section through a second design variant of the apparatus directly prior to the deformation of a connecting body.
Figure 3:
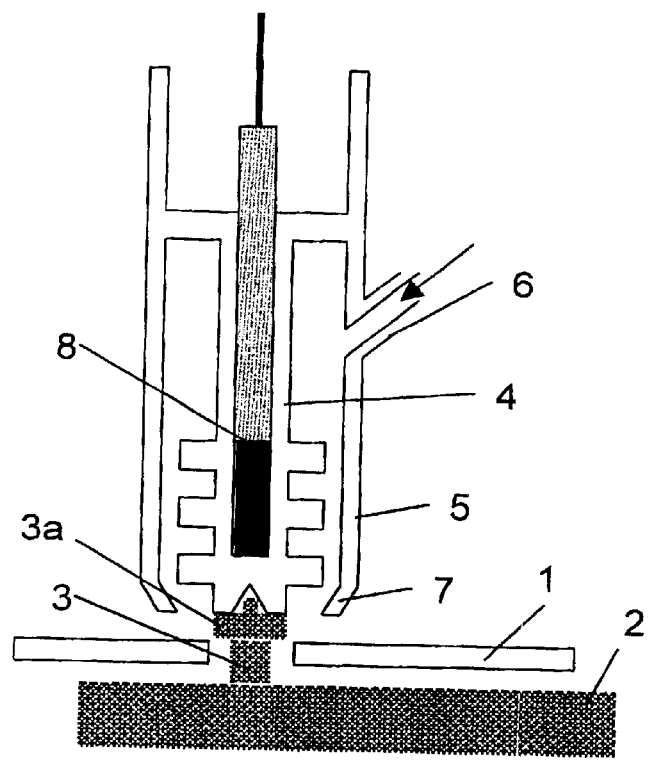
FIG. 3 shows the apparatus according to FIG. 2 at the beginning of the deforming process.

In the embodiments according to FIGS. 1 to 3, a shaping punch 4 is guided displacably in the vertical direction together with a flow-restricting means 5 which has a gas supply line 6 at its upper end. According to FIG. 1, the shaping punch 4 has a heating cartridge 8 in its interior, in the vicinity of the front end. According to FIG. 2, the shaping punch is provided on its outer circumference with heat-transfer ribs 9. By the arrangement of the heating cartridge 8 at the front end of the shaping punch 4 the heating energy is produced at the location where it is actually also required in the deforming process, and in addition the shaping punch can thereby be provided with a relatively small mass. In the embodiment according to FIG. 1, the distance between the shaping punch 4 and the flow-restricting means 5 is very narrow, so that the gas which is introduced through the heated shaping punch can be brought rapidly to the required temperature. In the embodiment according to FIG. 2, heat-transfer ribs are provided on the outer circumference of the shaping punch, in the vicinity of the lower end, the said heat-transfer ribs being used for heating up the gas introduced through the supply line 6 or the air which is introduced which flows downwards in the manner of a cyclone flow and emerges at the front end 7. An end 7 which is tapered in a nozzle-like manner is used for accelerating the gas flow and for reducing the outlet cross section of the flow-restricting means 5, which has had to be widened because of the heat-transfer ribs. This embodiment is used particularly when, in the case of relatively large, deformable connecting bodies, an increased amount of gas is necessary. In this case, the deformable connecting body 3 is heated up uniformly by the heated air until a state is reached in which this connecting body is plasticized. Then, starting from FIG. 1 and FIG. 2, as can be seen in FIG. 3, the shaping punch 4 is lowered together with the flow-restricting means 5 and the shaping process is carried out, i.e. a rivet head 3a is integrally formed on the upper end of the connecting body 3. When this rivet head has been formed, the heating power of the heating cartridge 8 is switched off and the gas supply through the gas supply line 6 increased. This is conventionally ambient air which then cools the shaping punch and the formed rivet head 3a. On account of the small mass of the shaping punch a relatively rapid cooling of the shaping punch and of the newly formed rivet head 3a in connection with the shaping punch takes place.

Figure 4:
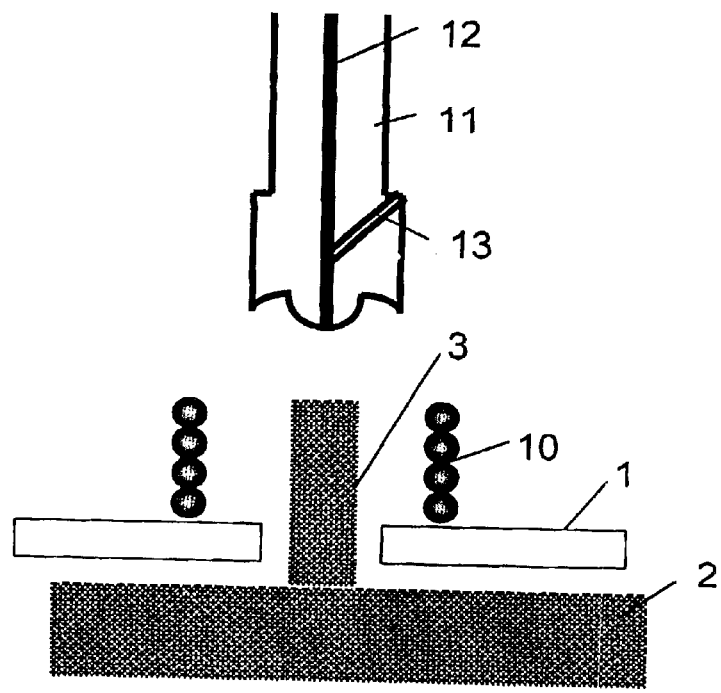
FIG. 4 shows a third design variant of the apparatus during the heating of a connecting body.
Figure 5:
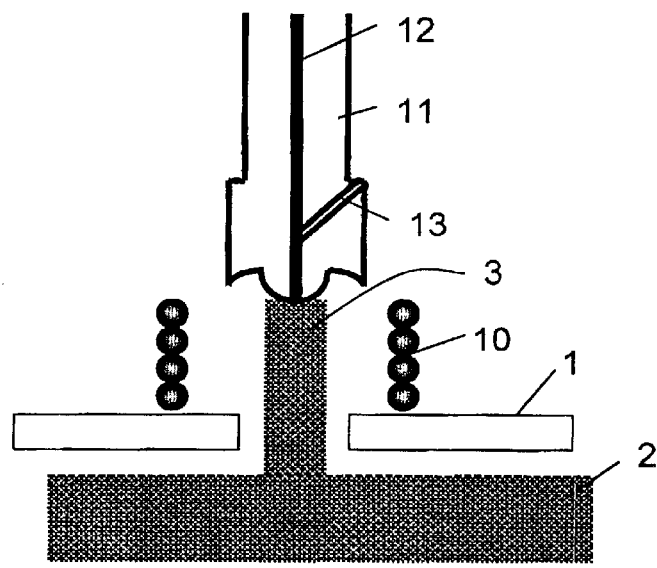
FIG. 5 shows the apparatus according to FIG. 4 at the beginning of the deforming process.
Figure 6:
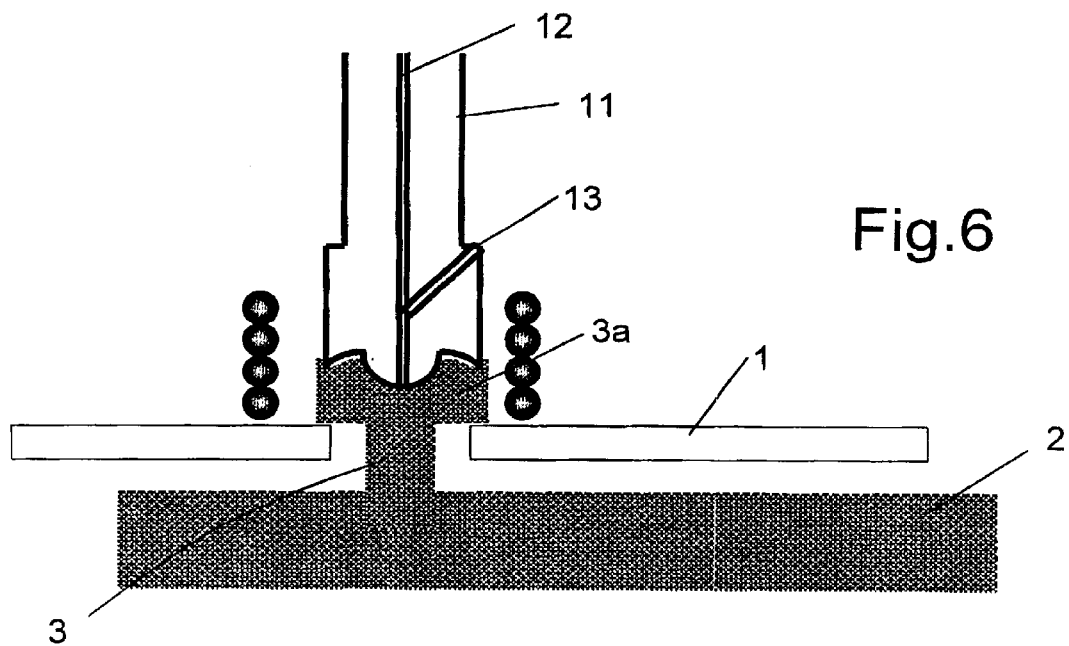
FIG. 6 shows the apparatus according to the FIGS. 4 and 5 at the end of the deforming process.

In the third variant of the apparatus, which is illustrated in FIGS. 4 to 6, the parts which are to be connected are likewise provided with the reference numbers 1 and 2 and the deformable connecting body with the reference number 3.

In a departure from the preceding apparatuses, here a radiating heating means 10 is provided which surrounds the deformable connecting body 3 with a tight clearance. A shaping punch 11, which cannot be heated, has in the centre a gas supply channel 12 which opens out at the front end of the shaping punch 11. A branch line 13 is able to conduct away the supplied gas to the outside when the front end of the channel 12 is closed, as occurs at the beginning of the deforming process. The beginning of the deforming process is illustrated in FIG. 5 while FIG. 6 shows the end of the deforming process. In FIG. 4, the shaping punch 11 is raised somewhat with respect to the deformable connecting body 3, so that the gaseous medium which is supplied through the channel 12 can flow downwards onto the deformable connecting body 3 and can also flow around the latter, with the result that this gas flow is heated by the radiating heating means 10 which simultaneously also heats up the connecting body 3. This gas flow has the effect that the connecting body 3 is heated up in a homogenous manner, since the radiating heating element 10 does not radiate heat uniformly over its entire height. At the beginning of the deforming process, which is illustrated in FIG. 5, the front end of the supply channel 12 is closed and the shaping punch 11 begins to deform the connecting body 3 which is in the plasticized state until a rivet head 3a in accordance with FIG. 5 is formed. During this deforming process, the supplied quantity of gas which flows in the channel 12 is increased and, because of the closure, this quantity of gas escapes through the branch line 13 at the front end of the channel 12. This gas flow effects cooling of the shaping punch and therefore also cooling of the integrally formed rivet head 3a, as a result of which the cycle time is substantially shortened.

What is claimed is:

1. A method for connecting objects by means of at least one plastically deformable connecting body, said method comprising uniformly heating a shaping punch having a free end, producing a heated gas flow by directing a gas around said shaping punch while it is uniformly heated.

uniformly heating a connecting body by directing said heated gas flow around the connecting body, permanently deforming the connecting body, while it is uniformly heated, by means of said free and of said shaping punch, stopping the heated gas flow at the latest directly after the deformation, depending on the heat content of the connecting body and the shaping punch, and maintaining a relatively cool gas flow on the connecting body and the shaping punch until the connecting body and the shaping punch are cooled.

2. A method as in claim 1 wherein said cool gas flow is greater, in terms of quantity, than said heated gas flow.

3. A method as in claim 1 wherein said connecting body has an upper end, said gas flow being directed downward over said connecting body and being restricted by a lateral wall.

4. A method as in claim 3 wherein said wall surrounds said shaping punch to form a gap between said wall and said shaping punch, and wherein said gas flow is introduced into said gap from above and directed toward said free end.

5. A method as in claim 4 wherein said gas flow is accelerated toward said free end of said shaping punch.

6. An apparatus for connecting objects by means of at least one plastically deformable connecting body, said apparatus comprising a shaping punch having a free lower end for shaping the deformable connecting body, an electric heating cartridge arranged inside the punch toward the lower free end for heating the free end of the shaping punch, a wall surrounding at least said free lower end of said shaping punch to form a gap, and a gas supply line for introducing a gaseous medium through said wall into the gap, whereby said gaseous medium can be heated by said shaping punch and can then heat said connecting body.

7. An apparatus as in claim 6 wherein said shaping punch and said means for restricting flow are movable together vertically.

8. An apparatus as in claim 6, wherein said shaping punch has an outside surface toward said free end, said outside surface having heat transfer ribs, said wall surrounding said heat transfer ribs.

9. An apparatus as in claim 6 wherein said means for restricting flow comprises a wall having an open lower end which tapers in a nozzle-like manner.

* * * * *

UNITED STATES PATENT AND TRADEMARK OFFICE
CERTIFICATE OF CORRECTION

PATENT NO.    : 6,649,114 B2
DATED         : November 18, 2003
INVENTOR(S)   : Hans Lochner It is certified that error appears in the above-identified patent and that said Letters Patent is hereby corrected as shown below:

<u>Title page</u>,
Item [75], Inventors, Hans Lochner, Marco Hobelsberger, Rupert Gschwendtner

Signed and Sealed this

Twentieth Day of July, 2004

JON W. DUDAS
*Acting Director of the United States Patent and Trademark Office*